Oct. 3, 1967  F. A. SCHROEDER ETAL  3,344,547
SPINNER OR PLUG CASTER
Filed Dec. 11, 1964  2 Sheets-Sheet 1
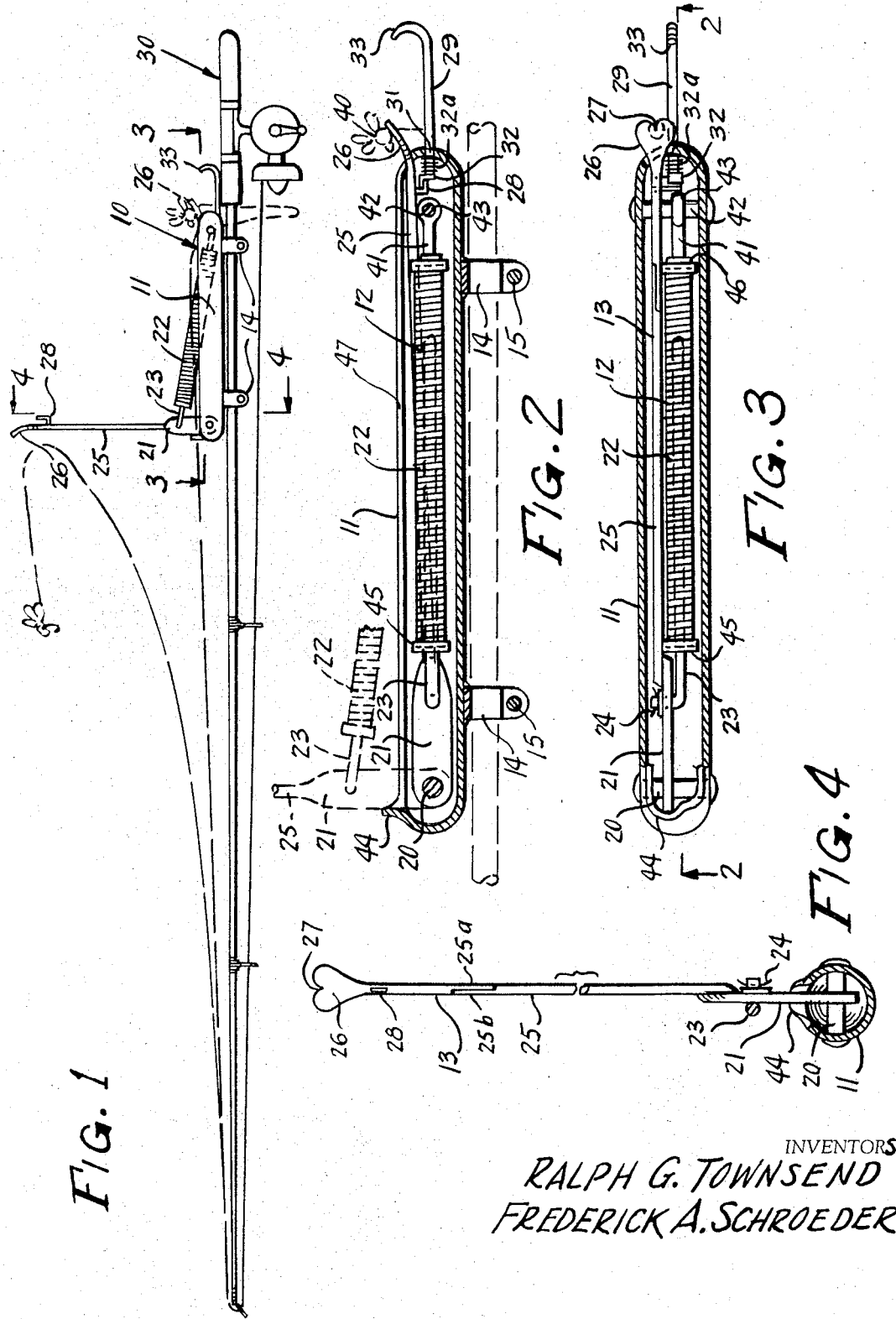
INVENTORS.
RALPH G. TOWNSEND
FREDERICK A. SCHROEDER

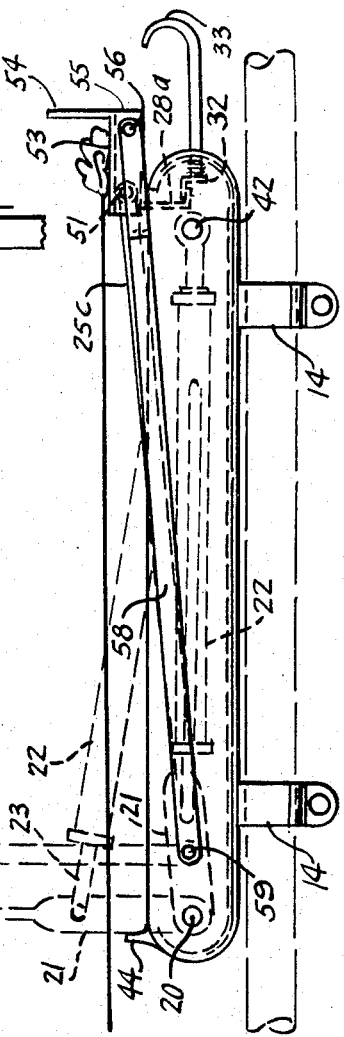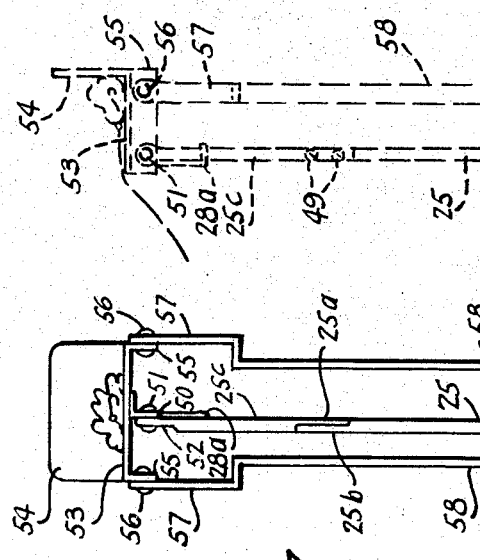

3,344,547
SPINNER OR PLUG CASTER
Frederick A. Schroeder, Sacramento, Calif. (P.O. Box 11, Loomis, Calif. 95650), and Ralph G. Townsend, 2187 54th Ave., Sacramento, Calif. 95822
Filed Dec. 11, 1964, Ser. No. 417,684
10 Claims. (Cl. 43—19)

This invention pertains to casting artificial lures for fishing. The device of this invention can also be used to cast live bait although it is a primary object of this invention to provide a device which will mechanically cast plugs, spinners and the like.

The principle of this invention involves the throwing of the lure from an artificial arm which is projected forward with considerable thrust by a compression spring. The artificial arm is mounted in a spring loaded housing wherein the spring energy is released by releasing a trigger latch in said housing.

It is a further object of this invention to provide a mechanical device which is capable of casting a spinner, plug, or other fiishing lure much further and more accurately than could be accomplished by physical exertion.

A still further object of this invention is to provide a mechanical casting device of the class described which is readily and interchangeably usable on any casting rod and especially a rod with a spinning reel thereon.

Another object of this invention is to provide an adjustable spring tension means whereby the length of cast caused by the casting device is determinable and adjustable.

It is proposed that by using my invention a fishing line can be thrown from the end of a fishing rod with facility and accuracy and it is submitted that this device will be particularly advantageous when used with spinning reels.

It is a further object of this invention to provide a means whereby artificial lure can be cast from underbrush without the danger that the line carrying the fishing lure will be caught in the bushes and trees which make up the underbrush. When casting from underbrush without a mechanical casting device, as is disclosed in this invention, the chances of catching the plug, spinner or other fishing lure in trees, bushes, etc. are very great. Therefore the use of the present casting device in such instances is readily apparent. It is further proposed that by using the casting device of this invention that the fishing lure can be cast to a predetermined spot with repeated accuracy. This allows a fisherman to find a good fishing spot and increases the chances of catching fish from such a spot.

The mechanical caster of this invention is adapted to be carried on the end of the fishing rod adjacent to the fishing reel, and the fishing line is brought back from the tip of the fishing pole and set into the mechanical caster at the base or reel end of the fishing pole.

An additional object of the invention is to provide a fishing line caster which can be used on fishing lines now in use without changing the structure of the fishing rods and in which the device is of a simple and economical construction.

With these and other objects in mind, the invention embodies a spring loaded cartridge-like frame having a casting arm mounted thereon adapted to be actuated by a compression spring and a trigger and trigger latch which can be actuated from the handle of the fishing rod. The cartridge-like frame is adapted to be secured to the fishing rod by clamps.

Now referring to the drawings and to the following detailed description thereof from which other features and advantages of the invention will appear wherein:

FIGURE 1 is a longitudinal elevational view of the casting device and of the fishing pole or rod, showing the casting arm in released or casting position;

FIGURE 2 is an enlarged cross-sectional view of the casting device of this invention taken along lines 2—2 of FIGURE 3 showing the casting arm in released projecting position and showing the actuating mechanism for the mechanical casting device in detail;

FIGURE 3 is an enlarged cross-sectional view of the mechanical casting device of this invention taken along lines 3—3 of FIGURE 1 showing the casting arm in locked casting position;

FIGURE 4 is an enlarged side cross-sectional view of the fishing rod and casting device of this invention taken along lines 4—4 of FIGURE 1 showing the casting arm in released projecting position;

FIGURE 5 is an enlarged fragmentary plan view of a constructional detail;

FIGURE 6 is an enlarged side elevational view of a modified form of construction, a different operating position being indicated in dotted line; and FIGURE 7 is an end elevational view of the construction of FIGURE 6.

Referring now to the drawings wherein like reference numerals denote corresponding parts of the improved mechanical casting device of this invention in the various views thereof. A casting unit 10 consisting of a cartridge-like housing 11 having a slot 47 and having propelling means such as a compression spring 12 and a casting arm 13 mounted therein is provided with clamps 14. The casting unit is mountable on a fishing rod such as spinning rod 30 shown in FIG 1 Clamps 14 are fastened around the fishing rod by conventional screw means 15.

Referring now to FIGS. 2, 3, and 4, the casting unit 10 has pivotal mounting means such as pivot pin 20 mounted at one end thereof. Pivotally mounted at one end to the pivot pin is an arm including actuating link 21. A compression spring 22 is retained in the casting unit and is adapted to function over means pivotally connected to link 21 such as a guide pin 23. The compression spring 22 is fixed at one end thereof to the guide pin, and the guide pin is bent in an L shape at one end thereof, this L shape construction being placed through an accommodating hole in the actuating link 21 and retained therein by a cotter pin 24.

The compression spring is affixed at the opposite end thereof to means pivotally connected to housing 11 such as a spring pin 41. This pin 41 is affixed to the cartridge housing 11 by a rivet pin 42 which passes through an eye 43 formed at the end of the spring pin. The eye and rivet pin connection allow a pivotal movement of the spring pin which is necessary when the casting device is actuated. The compression spring arrangement may be constructed so that the degree of compression on the spring is adjustable at either end. For example, means such as spring cap 45 affixed to guide pin 23 may be adjustably mounted thereon, and spring cap 46 affixed to spring pin 41 may be adjustably mounted to said spring pin.

Connected to the actuating link 21 at the end thereof opposite from the pivotal end is a casting arm 25. The casting arm may be adjustably mounted to the actuating link. A flattened ear 26 is provided at the other end of the casting arm. This ear 26 is notched at 27 and is bent upwardly, as seen in FIG. 2, so that a line held in the notch will be held away from the actuating mechanism of the casting unit and to give the artificial lure held by the notched portion 27 a more positive thrust when the casting arm is released. An L-shaped trigger latch 28 is connected to the casting arm 25 at a short distance from the ear 26. The trigger latch is engageable with selectively releasable means such as a trigger 29 which projects through an aperture 31 in the casting unit 10. An L-shaped latch retaining means 32 is connected to one end of the trigger 29. A trigger spring 32a is mounted over the shank of the trigger at one end thereof and is adapted to retain the latch retaining means in releasable engagement with the trigger latch 28. Said trigger spring is retained over the shank of the trigger 29 between one end wall of the cartridge-like housing and the latch retaining means, as seen in FIG. 2. The trigger shank is bent at the opposite end thereof to form a hook 33 which may be engaged by the finger of a fisherman.

An actuating link stop 44 is provided at the actuating link end of the cartridge-like hossing, see FIG. 2. This stop 44 serves to stop the forward motion of the actuating link and the casting arm affixed thereto when they are thrown forward by the force of the compression spring once the trigger releases the casting arm.

The mechanical casting device of this invention, together with the various elements which make up the casting device, may be made from any conventional material. The cartridge-like housing 11, for example, may be made from any resistant material such as stainless steel or may be made from a durable plastic.

Casting arm 25 may, if desired, be formed in two pieces having overlapping ends 25a and 25b connected by flush head screws 49, as shown in FIG. 5, for a purpose to be described hereinafter.

Having thus described the details of our casting device, we now refer to the operation of the invention.

The casting unit is mounted to an appropriate fishing rod by tightening the clamps provided therefor about the fishing rod. To so tighten the clamps, conventional screws 15 are provided. It is contemplated, however, that other fastening elements may be employed in place of the screw means, such as wing nuts.

The casting device is then cocked into a ready casting position. This is done by forcing the casting arm down into the casting mechanism against the force of the compression spring and locking the latch retainer means 32 of the trigger means 29 over the latch 28. Next the fishing line and the fishing lure are brought back from the rod tip and the line is placed in the slot 27 so that the whirl or other lure to line connection is caught in the slot 27.

As seen in FIG. 2, the whirl 40 connected to the fishing line is caught in the notch 27 and provides a force against which the casting arm 25 may react to cast the fishing lure.

After aiming the rod toward the spot which the fisherman desires to fish, the lure may be cast by releasing the trigger means 29. This is accomplished by placing a finger in the hook portion 33 of the trigger 29 and pullng the trigger so that the latch 28 is released from the latch retainer 32, whereupon the casting arm 25 and the actuating link 21 will be thrust forward and pivoted about pivot pin 20 by the force of the compression spring 22 acting against the compression pin 23 and actuating link 21. The lure carried by the actuating arm will be thrown forward with the casting arm and when the actuating link strikes against the link stop 44 to stop the forward motion of the actuating link and the casting arm, the lure will be cast from the casting arm and will be cast out over the rod tip and far in advance thereof, the spinning reel having been released by the fisherman according to conventional practice in spinner fishing.

The fishing lure may then be retrieved by reeling in the line in the conventional manner.

Under certain conditions, as, for example, when live bait, or fish eggs encased in usual netting, or other soft material from which the hook may be readily pulled is employed, the heart shaped ear 26, as employed for fly casting is unsuitable. Under these conditions, the screws 49 are released and arm portion 25a and its associated ear are moved. An alternate arm section 25c, as shown in FIGS. 6 and 7 is substituted therefor, and secured by repositioning screws 49. The free end of section 25c is flattened as at 50 and pivotally connected by means of a pivot 51 to a lug 52 carried by the underside of a flat bait carrying platform 53. Platform 53 has an upstanding rear wall 54, which serves to retain live bait thereon during the casting action and depending side flanges 55.

Lug 52 depends from a portion of platform 53 adjacent the front, while pivoted, by pivots 56 to flanges 55 adjacent the rear or wall 54 are the offset extremities 57 of a pair of support arms 58. The lower ends of arms 58 are connected to pivot pins 59 which extend through the side walls of casing 11 in normally horizontal alignment with pivot pin 20. The platform 53 is held in continuously horizontal position by means of arms 58, from the set position shown in full lines in FIG. 6 through its normal arc of travel to the full casting position as shown in dotted lines in FIGURE 6. A hook 28a identical to hook 28 engages trigger 29 in a manner identical to that previously described. The other components shown in FIGS. 6 and 7 are substantially identical to those of the previous modification, and carry the same reference numerals. Similarly, the operation of this form of the invention is identical to that above described.

Modifications of this invention will be readily apparent to those skilled in the art. Therefore we do not intend to be limited to the precise details hereof but desire to protect our invention within the spirit and scope thereof as set forth in the appended claims.

We claim:

1. A casting device comprising in combination a housing, a pivot pin at one end of said housing, a casting arm mounted on said pivot pin and movable from a position substantially within said housing to a position out of said housing, spring means connected to said arm and housing for biasing said arm towards said position out of said housing, a bait holder at the free end of said casting arm, said bait holder comprising a bait holding platform and means for retaining said platform in substantially level position during the movement of said casting arm, detent means in said housing normally retaining said casting arm substantially in said housing, and trigger means for releasing said detent means whereby said spring actuates said arm to cast bait carried by said bait holder.

2. The structure of claim 1 wherein the end of said arm is pivotally connected to said platform adjacent a forward edge thereof, and supporting members pivotally connected at one end to said platform adjacent a rear edge thereof, the other ends of said supporting members being pivoted to said housing in horizontal alignment with said first-mentioned pivot pin, the distance between the pivotal connection of said arm to said platform and said members to said platform being substantially equal to the distance between the pivotal connection of said arm in said casing and said members to said casing, whereby said arm and said members swing in uniform arcs, thus constituting the means for maintaining said platform in level position.

3. In a mechanical fishing line casting device of the type constructed for attachment to a conventional fishing pole or rod and having a casting arm and a spring adapted for exerting a propelling force on said arm, the improvement wherein:

the spring is an elongate compression spring;
and further comprising:
an elongate cartridge-like housing having a longitudinally extending slot along one side thereof;
means pivotally mounting one end of the casting arm in one end of the housing
means pivotally securing one end of the compression spring to the casting arm at a point intermediate the ends thereof at a point proximate said one end;
means pivotally securing the other end of the compression spring in the other end of the housing; and
selectively releasable means in the other end of the housing for selectively securing the casting arm and the compression spring substantially inside the housing with said compression spring in a state of compression, and for selectively releasing said casting arm for pivotal movement through said slot to a position substantially outside the housing, said casting arm pivotally moving under force exerted by said compression spring.

4. The casting device of claim 3 wherein:
the means pivotally securing said one end of the compression spring to the casting arm is constructed and arranged to carry said one end through said slot to a point substantially outside said housing proximate the one end of said housing.

5. The casting device of claim 3 wherein:
the means pivotally securing said one end of the compression spring to the casting arm further comprises,
  means for adjusting the degree of compression of the compression spring.

6. The casting device of claim 3 wherein:
the means pivotally securing the other end of the compression spring in the other end of the housing further comprises,
  means for adjusting the degree of compression of the compression spring.

7. The casting device of claim 3 further comprising:
a bait holding platform pivotally secured at the other end of the casting arm; and
means interconnecting the bait holding platform and the housing for maintaining the bait holding platform in a substantially level position during movement of the casting arm.

8. The casting device of claim 7 wherein:
the means interconnecting the bait holding platform and the housing comprises,
  at least one support arm pivotally connected at the respective ends thereof to the bait holding platform and the housing.

9. In a mechanical fishing line casting device of the type having a pivotally mounted casting arm and means operatively connected therewith for pivotally propelling said casting arm, the improvement which comprises:
a bait holding platform pivotally secured adjacent the distal end of the casting arm; and
means connected to said bait holding platform for maintaining the bait holding platform in a substantially level position during movement of the casting arm.

10. The casting device of claim 9 further comprising:
a housing;
means pivotally securing the proximate end of the casting arm thereto;
means interconnecting the means for propelling the casting arm and the housing;
and wherein:
the means for maintaining the bait holding platform substantially level comprises,
  at least one elongate member interconnecting the housing and the bait holding platform.

References Cited

UNITED STATES PATENTS

| | | | |
|---|---|---|---|
| 1,140,608 | 5/1915 | Phillips | 43—19 |
| 1,226,162 | 5/1917 | Attula | 43—19 |
| 2,658,299 | 11/1953 | Maxfield | 43—25 X |
| 2,765,568 | 10/1956 | Kozar | 43—19 |
| 2,847,987 | 8/1958 | Silverstein | 43—19 X |
| 2,933,845 | 4/1960 | Millet | 43—19 |
| 3,217,442 | 11/1965 | Nygren | 43—19 |

SAMUEL KOREN, *Primary Examiner.*

WARNER H. CAMP, *Examiner.*